(12) United States Patent
Murison et al.

(10) Patent No.: US 7,457,329 B2
(45) Date of Patent: Nov. 25, 2008

(54) METHOD AND SYSTEM FOR A HIGH POWER LOW-COHERENCE PULSED LIGHT SOURCE

(75) Inventors: Richard Murison, St-Lazare (CA);
Tullio Panarello, St-Lazare (CA);
Benoit Reid, Laval (CA); Reynald Boula-Picard, Montreal (CA)

(73) Assignee: PyroPhotonics Lasers Inc., Dollard-des-Ormeaux, Quebec (CA)

( * ) Notice: Subject to any disclaimer, the term of this patent is extended or adjusted under 35 U.S.C. 154(b) by 0 days.

(21) Appl. No.: 11/737,044

(22) Filed: Apr. 18, 2007

(65) Prior Publication Data
US 2007/0248138 A1 Oct. 25, 2007

Related U.S. Application Data

(60) Provisional application No. 60/793,494, filed on Apr. 19, 2006.

(51) Int. Cl.
*H01S 3/10* (2006.01)
(52) U.S. Cl. .............................. 372/20; 372/26; 372/70
(58) Field of Classification Search .................. 372/20, 372/70
See application file for complete search history.

(56) References Cited

U.S. PATENT DOCUMENTS 6,470,113 B1   10/2002   Hwang et al.
6,570,893 B1 *  5/2003   Libatique et al. .............. 372/20
6,757,307 B2   6/2004   Hogan
2004/0057475 A1   3/2004   Frankel et al.
2005/0036525 A1 *  2/2005   Liu ............................... 372/6

FOREIGN PATENT DOCUMENTS
WO   WO2005/577737   6/2005

OTHER PUBLICATIONS

Chen et al., "Low Crosstalk and Compact Optical Add-Drop Multiplexer Using a Multiport Circulator and Fiber Bragg Gratings", IEEE Photonics Technology Letters, Oct. 2000, vol. 12, No. 10, pp. 1394-1396.
Di Teodoro et al., "High Power Pulsed Fibre Source at 1567 nm", Electronics Letters, 25. Nov. 2004, vol. 40, No. 24, 2 pages total.
Guan et al., "Low Coherence Interrogation Scheme for Multiplexed Sensors Based on Long-Period Grating Mach-Zehnder Interferometers" IEEE Photonics Technology Letters, Apr. 1, 2006, vol. 18, No. 7, pp. 832-834.

* cited by examiner

*Primary Examiner*—Dung T Nguyen
(74) *Attorney, Agent, or Firm*—Townsend & Townsend and Crew LLP

(57) ABSTRACT

A high power pulsed optical source includes a multi-port optical circulator and a seed source coupled to a first port of the multi-port optical circulator. The seed source is adapted to provide amplified spontaneous emission. The high power pulsed optical source also includes a first reflective device coupled to a second port of the multi-port optical circulator and a first double-pass optical amplifier coupled at a first end to a third port of the multi-port optical circulator and coupled at a second end to an amplitude modulator. The high power pulsed optical source also includes a second reflective device coupled to the amplitude modulator and an output port coupled to a fourth port of the multi-port optical circulator.

20 Claims, 4 Drawing Sheets

METHOD AND SYSTEM FOR A HIGH POWER LOW-COHERENCE PULSED LIGHT SOURCE

CROSS-REFERENCES TO RELATED APPLICATIONS

The present application claims benefit under 35 U.S.C. § 119(e) of U.S. Provisional Patent Application No. 60/793,494, filed Apr. 19, 2006, which is incorporated herein by reference in its entirety.

BACKGROUND OF THE INVENTION

The present invention relates generally to the field of tunable light sources. More particularly, the present invention relates to a method and apparatus for providing high power pulsed optical sources useful for industrial applications such as trimming, marking, cutting, and welding. Merely by way of example, the invention has been applied to a light source with real-time tunable characteristics including pulse width, peak power, repetition rate, and pulse shape. However, the present invention has broader applicability and can be applied to other optical sources.

Pulsed laser sources, such as Nd:YAG lasers have been used to perform laser-based material processing for applications such as marking, engraving, micro-machining, and cutting. Depending on the application and the materials to be processed, the various characteristics of the laser pulses, including pulse width, pulse repetition rate, peak power or energy, and pulse shape, are selected as appropriate to the particular application. Many existing high power pulsed lasers, for example, having pulse energy greater than 0.5 mJ per pulse rely on techniques such as Q-switching and mode locking to generate optical pulses. However, such lasers produce optical pulses with characteristics that are predetermined by the cavity geometry, the mirror reflectivities, and the like and cannot generally be varied in the field without compromising the laser performance. Using such lasers, it is generally difficult to achieve a range of variable pulse characteristics.

Generally, these laser sources emit one or more narrow spectral linewidths associated with the longitudinal modes of the laser cavity. These narrow spectral linewidths can give rise to problems due to Stimulated Brillouin Scattering (SBS) in certain embodiments thereof. A discussion of SBS in optical fibers can be read in "Nonlinear Fiber Optics" by G. P. Agrawal, published by Academic Press.

As an alternative to narrow linewidth laser sources, low-coherence sources have been utilized to minimize SBS. However, conventional low-coherence sources are typically characterized by excessively broad linewidths, for which the optical power available in the spectral band of interest for a particular application is low. Therefore, low-coherence sources provide limited output power.

Thus, there is a need in the art for low-coherence pulsed light sources with improved power output and tunable pulse characteristics.

SUMMARY OF THE INVENTION

According to the present invention, techniques generally related to the field of tunable light sources are provided. More particularly, the present invention relates to a method and apparatus for providing high power pulsed optical sources useful for industrial applications such as trimming, marking, cutting, and welding. Merely by way of example, the invention has been applied to a light source with real-time tunable characteristics including pulse width, peak power, repetition rate, and pulse shape. However, the present invention has broader applicability and can be applied to other optical sources.

According to an embodiment of the present invention, a high power pulsed optical source is provided. The high power pulsed optical source includes a multi-port optical circulator and a seed source coupled to a first port of the multi-port optical circulator. The seed source is adapted to provide amplified spontaneous emission. The high power pulsed optical source also includes a first reflective device coupled to a second port of the multi-port optical circulator a first double-pass optical amplifier coupled at a first end to a third port of the multi-port optical circulator and coupled at a second end to an amplitude modulator. The high power pulsed optical source further includes a second reflective device coupled to the amplitude modulator and an output port coupled to a fourth port of the multi-port optical circulator.

According to another embodiment of the present invention, a method of providing a low-coherence high power pulsed optical emission is provided. The method includes providing a low-coherence seed source, amplifying the seed signal in a first optical amplifier to define a first pass through the first optical amplifier, transmitting the seed signal through an amplitude modulator to define a first pass through the amplitude modulator, and time-domain filtering the seed signal to provide a pulse. Time-domain filtering includes modulating a drive signal for the amplitude modulator. The method also includes amplifying the pulse in a second optical amplifier to define a first pass through the second optical amplifier, frequency-domain filtering the amplified pulse to provide a spectrally filtered pulse, and amplifying the spectrally filtered pulse in the second optical amplifier to define a second pass through the second optical amplifier. The method further includes transmitting the amplified spectrally filtered pulse through the amplitude modulator to define a second pass through the amplitude modulator and time-domain filtering the amplified spectrally filtered pulse to provide an intermediate pulse. Time-domain filtering includes modulating the drive signal for the amplitude modulator. Additionally, the method includes amplifying the intermediate pulse in the first optical amplifier to define a second pass through the first optical amplifier.

Numerous benefits are achieved using the present invention over conventional techniques. For example, in an embodiment according to the present invention, high power, pulsed lasers suitable for laser processing are provided that utilize a compact architecture that is inexpensive in comparison to lasers with comparable performance characteristics. Moreover, embodiments of the present invention generate short pulses with pulse characteristics that are tunable in real-time while maintaining pulse-to-pulse stability. Furthermore, in an embodiment according to the present invention, optical pulses can be shaped to optimize the pulse profile for particular applications, or to maximize energy extraction efficiency in the laser system. Depending upon the embodiment, one or more of these benefits may exist. These and other benefits have been described throughout the present specification and more particularly below. Various additional objects, features and advantages of the present invention can be more fully appreciated with reference to the detailed description and accompanying drawings that follow.

DETAILED DESCRIPTION OF SPECIFIC EMBODIMENTS

According to the present invention, techniques generally related to the field of tunable light sources are provided. More particularly, the present invention relates to a method and apparatus for providing high power pulsed optical sources useful for industrial applications such as trimming, marking, cutting, and welding. Merely by way of example, the invention has been applied to a light source with real-time tunable characteristics including pulse width, peak power, repetition rate, and pulse shape. However, the present invention has broader applicability and can be applied to other optical sources.

Figure 1:
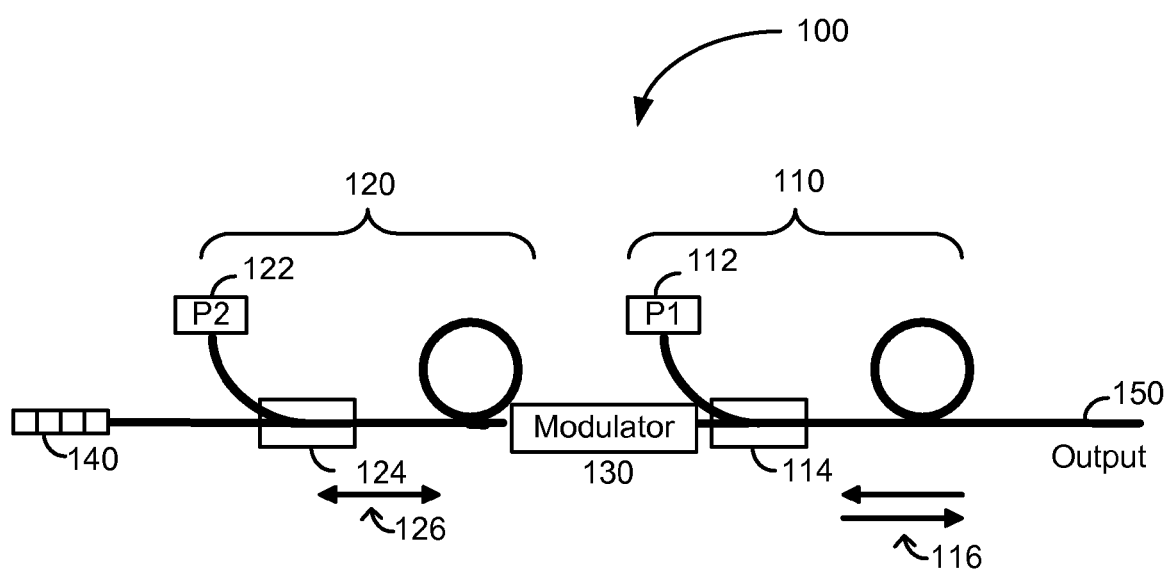
FIG. 1 is a simplified schematic illustration of a conventional low-coherence optical source.

FIG. 1 is a simplified schematic illustration of a conventional low-coherence optical source. Optical source 100 includes a first optical amplifier 110, an amplitude modulator 130, a second optical amplifier 120, and a grating reflector 140. The first optical amplifier produces a continuous stream of amplified spontaneous emission (ASE), which emerges from both ends of the amplifier. The ASE emerging from the left end of the first optical amplifier 110 impinges on amplitude modulator 130, for which the default state is "off." In order to generate a pulse traveling from the first optical amplifier 110 through the amplitude modulator 130, the amplitude modulator is pulsed to the "on" state. The pulse width and shape of the optical pulse are controlled via the drive signal applied to the amplitude modulator.

The pulse traveling to the left passes through the second optical amplifier 120, where it is amplified before reflecting off the grating reflector. After reflection, the amplified pulse travels to the right, where it is once again amplified passing through the second optical amplifier. The amplitude modulator 130 is pulsed to the "on" state coincident with the arrival of the right-going amplified pulse. The signal emerging for the second time from the amplitude modulator 130 is then amplified passing to the right through the first optical amplifier 110. The output of the optical source exits the optical device 100 at output 150.

Although the optical device 100 produces amplified low-coherence pulses, the power output capability of the optical device 100 is limited by the gain of the first and second optical amplifiers. The gain of the amplifiers is in turn limited by either the onset of instabilities at high levels of gain, or by an excessive magnitude of the ASE which serves to depress the gain. Additionally, in general, the ASE power incident on the amplitude modulator is limited to a maximum level for reasons of stability and reliability. In many applications, the grating reflector 140 is designed to reflect only a portion of the spectral content of the signal impinging upon it. Therefore, the portion of the ASE produced by the first optical amplifier 110 and amplified by the second optical amplifier 120 that lies outside the reflection bandwidth of the grating reflector 140 represents a wasteful power loading on the amplitude modulator. In fact, if the bandwidth of the grating reflector 140 is particularly small, only a small fraction of the power incident on the amplitude modulator is utilized.

Figure 2:
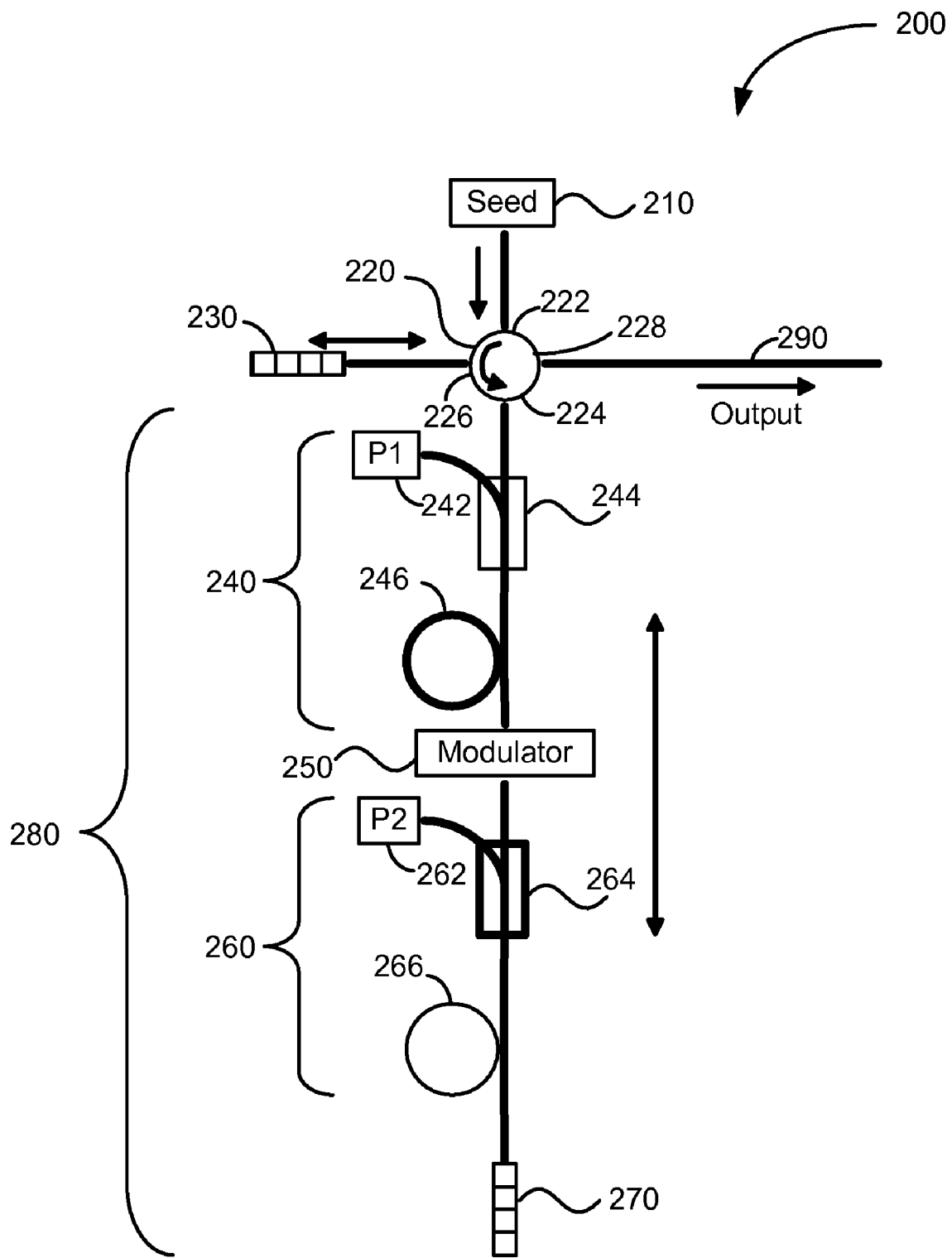
FIG. 2 is a simplified schematic illustration of a low-coherence high power pulsed optical source according to an embodiment of the present invention.

FIG. 2 is a simplified schematic illustration of a low-coherence high power pulsed optical source according to an embodiment of the present invention. Low-coherence optical source 200 includes a seed source 210 injected into a first port of a four-port optical circulator 220. The seed source 210 is adapted to provide a signal with a broad spectral linewidth. In a particular embodiment, the seed source 210 is adapted to provide amplified spontaneous emission (ASE) and in an embodiment, is a superluminescent semiconductor diode. In another particular embodiment, seed source 210 is a semiconductor optical amplifier.

Seed source 210 is coupled to a first port of a four-port optical circulator 220. In an embodiment, the seed source 210 is coupled to the first port 222 of the optical circulator 220 using a length of optical fiber or other optical system. Four-port optical circulators are well known in the art and are available from several suppliers, for example, model OLCIR-P-4-106-500-25-NC from Optolink Corporation of Hong Kong. The four-port circulator could equally well comprise two three-port circulators. Three-port circulators are well known in the art and are available from several suppliers, for example model OC-3-1064-PM from OFR, Inc. of Caldwell, N.J. The optical circulator 220 doesn't need to be fiberized. For example, it can include only bulk optics elements. In one embodiment, the optical circulator 220 includes a free-space optical isolator with open dump ports as may be provided, for example, by Electro-Optics Technology Inc of Traverse City, Mich. The seed source 210 may also be a free-space source optically coupled to the free-space circulator. One of ordinary skill in the art would recognize many variations, modifications, and alternatives.

The injected signal emerges from a second port 226 of the circulator 220 and impinges on a first reflective device 230, also referred to as a reflecting structure. The reflecting structure performs spectral domain filtering of the seed source 210. In an embodiment, the reflecting structure 230 is a fiber Bragg grating (FBG) that is written directly in a fiber connected to the four-port circulator 220. The periodicity and grating characteristics of the FBG are selected to provide desired reflectance coefficients as is well known in the art. Merely by way of example, in a particular embodiment, the reflecting structure 230 is a FBG having a peak reflectance greater than 90%, and a center wavelength and spectral width closely matched to the output of the seed source 210.

The signal reflected from the first reflective device is re-injected into the second port 226 of circulator 220. This injected signal in turn emerges from a third port 224 of circulator 220, and is injected into a time-domain and spectral-domain optical amplifier 280. As described more fully below, optical amplifier 280 includes a number of components that provide for filtering and amplification of the signal injected from the third port 224 of the four-port optical circulator 220.

Optical amplifier 280 includes a first double-pass optical amplifier 240 coupled at a first end to a third port 224 of the four-port optical circulator 220 and coupled at a second end to an amplitude modulator 250. According to an embodiment of the present invention, the optical amplifier 240 is an optical fiber amplifier. Fiber amplifiers utilized in embodiments of the present invention include, but are not limited to rare-earth-doped single-clad, double-clad, or even multiple-clad optical fibers. The rare-earth dopants used in such fiber amplifiers include Ytterbium, Erbium, Holmium, Praseodymium, Thulium, or Neodymium. In a particular embodiment, all of the fiber-optic based components utilized in constructing optical amplifier 240 utilize polarization-maintaining single-mode fiber.

Embodiments of the present invention utilize a fiber amplifier as optical amplifier 240, including a pump 242 that is coupled to a rare-earth-doped fiber loop 246 through an optical coupler 244. Generally, a semiconductor pump laser is used as pump 242, although pumping of optical amplifiers can be achieved by other means as will be evident to one of skill in the art. In alternative embodiments, the optical amplifier 260 is a solid-state amplifier including, but not limited to, a solid-state rod amplifier, a solid-state disk amplifier or gaseous gain media. In a particular embodiment, the optical amplifier 240 includes a 5 meter length of rare-earth doped fiber 246, having a core diameter of approximately 4.8 μm, and is doped with Ytterbium to a doping density of approximately $6 \times 10^{24}$ ions/m$^3$.

The amplifier 240 also includes a pump 242, which is an FBG-stabilized semiconductor laser diode operating at a wavelength of 976 nm, and having an output power of 500 mW. In another particular embodiment, the optical amplifier 240 includes a 2 meter length of rare-earth doped fiber 246, having a core diameter of approximately 10 μm, and is doped with Ytterbium to a doping density of approximately $1 \times 10^{26}$ ions/m$^3$. The fiber length may be shorter or longer than 2 m. For example, it can have a length of 3 m, 4 m, or 5 m. In an alternative embodiment, the pump 242 for the amplifier 240 is a semiconductor laser diode having an output power of 5 W. The output power may by less than or greater than 5 W depending on the particular application. For example, in some embodiments, it ranges from about 2 W to about 5 W, whereas in other embodiments, it ranges from about 5 W to about 10 W.

In embodiments of the present invention, the signal emerging from the first optical amplifier 240 and incident on amplitude modulator 250 is a substantially amplified version of the signal injected into the amplifier 240 from the third port 224 of the four-port optical circulator.

The optical amplitude modulator 250 is normally held in an "off" state, in which the signal impinging on the modulator is not transmitted. According to embodiments of the present invention, optical amplitude modulator provides amplitude modulation and time-domain filtering of the seed signal as well as amplified spontaneous emission (ASE) filtering. In a particular embodiment, the length of the optical pulse is generated by the optical amplitude modulator 130, which is an APE-type Lithium Niobate Mach-Zehnder modulator having a bandwidth >3 GHz at 1064 nm. This bandwidth is necessary to generate short optical pulses provided by some embodiments of the present invention. In other embodiments, the optical amplitude modulator 250 is a phase or frequency modulator with a suitable phase or frequency to amplitude converter, such as an edge optical filter, an extinction modulator, or an acousto-optic modulator.

In order to pass the seed signal, the optical amplitude modulator 250 is pulsed to the "on" state for a first time to generate an optical pulse. The pulse width and pulse shape of the optical pulse generated by the optical amplitude modulator 250 are controlled by the modulator drive signal, provided by a modulator controller (not shown) applied to the optical amplitude modulator 250. According to embodiments of the present invention, the amplitude modulator 250, driven by a time varying drive signal, provides time-domain filtering of the seed signal, thereby generating a laser pulse with predetermined pulse characteristics, including pulse width, pulse shape, and pulse repetition rate.

Optical amplifier 280 further includes a second double-pass optical amplifier 260 coupled between the amplitude modulator 250 and a second reflective device 270. According to an embodiment of the present invention, the optical amplifier 260 is an optical fiber amplifier. Fiber amplifiers utilized in embodiments of the present invention include, but are not limited to rare-earth-doped single-clad, double-clad, or even multiple-clad optical fibers. The rare-earth dopants used in such fiber amplifiers include Ytterbium, Erbium, Holmium, Praseodymium, Thulium, or Neodymium. In a particular embodiment, all of the fiber-optic based components utilized in constructing optical amplifier 260 utilize polarization-maintaining single-mode fiber.

Referring to FIG. 2, in embodiments utilizing fiber amplifiers, a pump 262 is coupled to a rare-earth-doped fiber loop 266 through optical coupler 264. Generally, a semiconductor pump laser is used as pump 262. One of ordinary skill in the art would recognize many variations, modifications, and alternatives. In alternative embodiments, the optical amplifier 260 is a solid-state amplifier including, but not limited to, a solid-state rod amplifier, a solid-state disk amplifier or gaseous gain media. In a particular embodiment, the optical amplifier 260 includes a 5 meter length of rare-earth doped fiber 266, having a core diameter of approximately 4.1 μm, and doped with Ytterbium to a doping density of approximately $4 \times 10^{24}$ ions/m$^3$. The amplifier 260 also includes a pump 262, which is an FBG-stabilised semiconductor laser diode operating at a wavelength of 976 nm, and having an output power of 100 mW. The output power of the pump can be greater than or less than 100 mW depending on the particular application. For example, it may be range from about 100 mW to about 1 W. In another particular embodiment, the pump 262 can be a semiconductor laser diode operating at a wavelength around 915 nm. In yet another particular embodiment, the pump 262 can be a semiconductor laser diode operating at an output power of 450 mW or more. The amplifier 260 also includes a pump to fiber coupler 264, which is a WDM pump combiner.

According to an embodiment of the present invention, amplifiers 250 and 260 share common components to reduce system cost, improve reliability, and provide other benefits. However, although amplifiers 250 and 260 may be identical in some embodiments, this is not required by the present invention, as the various amplifiers may include elements not shared by the other amplifier as appropriate to a particular application.

In some embodiments requiring less optical output, the second optical amplifier 260 is removed, simplifying the optical system 200 and generally reducing system cost. In these embodiments, the second reflective device is coupled to amplitude modulator 250. In other embodiments, the first optical amplifier 240 is removed to achieve similar objectives. One of ordinary skill in the art would recognize many variations, modifications, and alternatives.

In an embodiment, the reflecting structure 270 is a fiber Bragg grating (FBG) that is written directly in the fiber used as the optical amplifier 260. The periodicity and grating characteristics of the FBG are selected to provide desired reflectance coefficients as is well known in the art. Merely by way of example in a particular embodiment, the reflecting structure 270 is a FBG having a peak reflectance greater than 90%, and a center wavelength and spectral width closely matched the reflection peak of the first reflective device 230.

Embodiments of the present invention maximize the in-band power incident on the amplitude modulator 250, while at the same time minimizing the out-of band power loading on the amplitude modulator.

After reflection from second reflecting device 270, the pulse propagates through the second optical amplifier 260 and impinges on the optical amplitude modulator 250, which is then pulsed to the "on" state a second time to allow the incident pulse to pass through. According to embodiments of the present invention, the timing of the second "on" pulse of the optical amplitude modulator 250 is synchronized with the first opening of the modulator 250 (first "on" pulse) to take account of the transit time of the signal through the amplifier 260 and the reflecting structure 270. After emerging from the optical amplitude modulator 250, the amplified pulse propagates through the first optical amplifier 240, thereby making the second pass through the double-pass optical amplifiers.

After reentering into the third port 224 of optical circulator 220, the amplified signal emerges from the fourth port 228 of the optical circulator 220 and exits the optical system 200 at output port 290.

In another particular embodiment, in order to pass the signal between the first optical amplifier 240 and the second optical amplifier 260, the optical amplitude modulator 250 is pulsed once instead of twice. The optical amplitude modulator 250 is turned to the "on" state to generate the rising edge of the pulse propagating toward the second optical amplifier 260. This signal is then amplified a first time through optical amplifier 260. The signal then impinges on the reflecting structure 270 and is amplified a second time through optical amplifier 260. Now the signal emerging from optical amplifier 260 impinges on the optical amplitude modulator 250, which is subsequently turned to the "off" state. The pulse width is therefore given by the time duration during which the optical amplitude modulator 250 is held in the "on" state subtracted by the transit time of the signal through the amplifier 260 and the reflecting structure 270.

Figure 3:
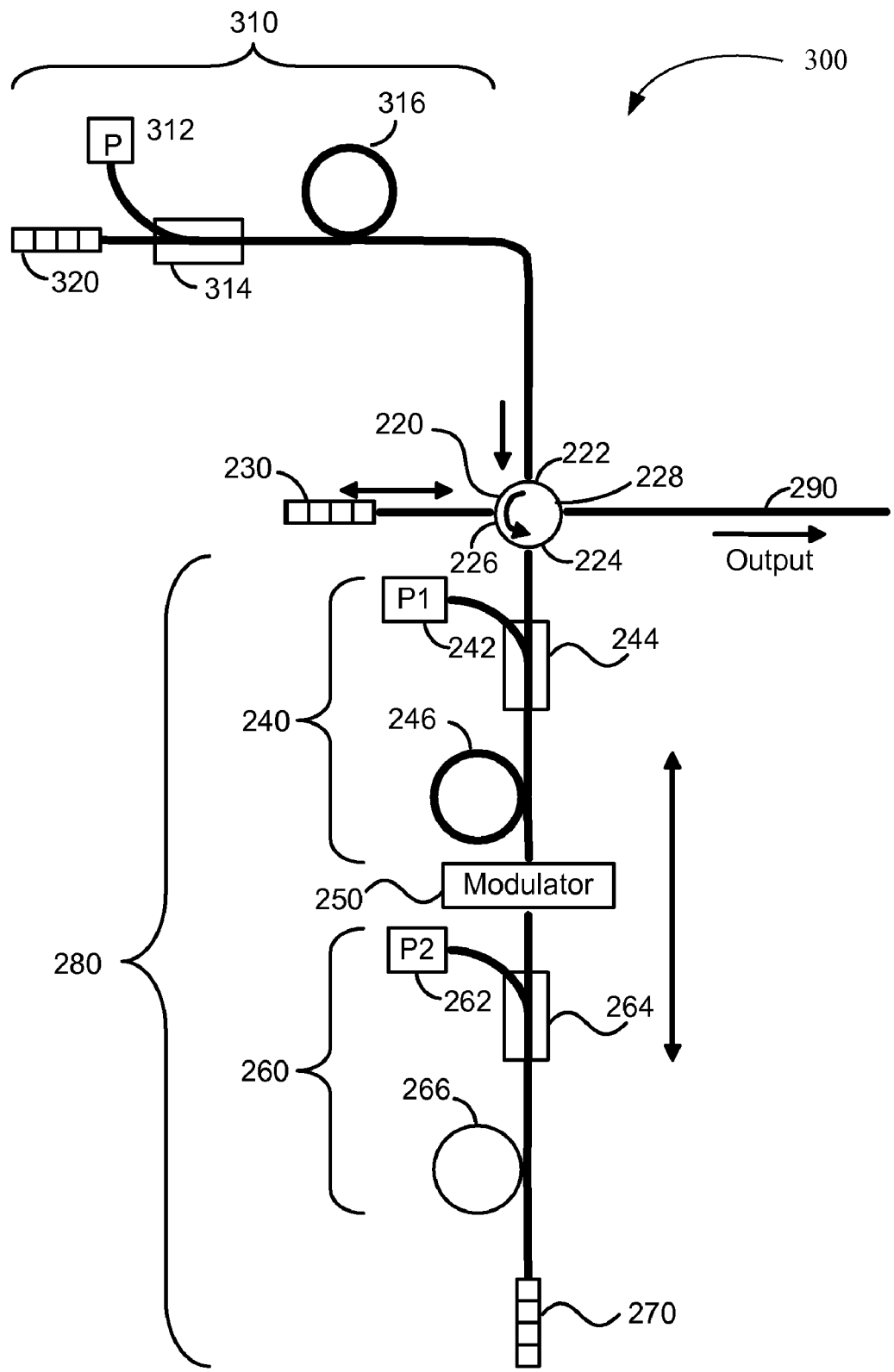
FIG. 3 is a simplified schematic illustration of a low-coherence high power pulsed optical source according to another embodiment of the present invention.

FIG. 3 is a simplified schematic illustration of a low-coherence high power pulsed optical source according to another embodiment of the present invention. In the embodiment illustrated in FIG. 3, the seed source 310 is a superfluorescent source including a gain medium 316, a pump device 312, a fiber coupler 314, and a third reflective device 320.

In a particular embodiment of the present invention, the fiber-optic based components utilized in seed source 310 utilize polarization-maintaining single-mode fiber. Thus, in this particular embodiment, the seed source 310 includes a length of rare-earth-doped optical fiber 316, pumped by a semiconductor pump laser 312 coupled to the fiber 316 using fiber coupler 314. The third reflective device 320 is an FBG. In embodiments of the present invention, the reflection peak of the third reflective device 320 (e.g., a FBG) is selected to be a predetermined wavelength corresponding to the reflection peak of the first reflective device 230. In a specific embodiment, the predetermined wavelength is closely matched to the reflection peak of the first reflective device 230.

Thus, the seed source 310 generates ASE that is used as the input to the multi-port optical circulator 220. The wavelength of operation of the seed source 310 will be a function of the various components utilized, including the gain bandwidth of the optical fiber 316, the wavelength of the pump 312, and the spectral characteristics of the third reflective device 320. One of ordinary skill in the art would recognize many variations, modifications, and alternatives.

Figure 4:
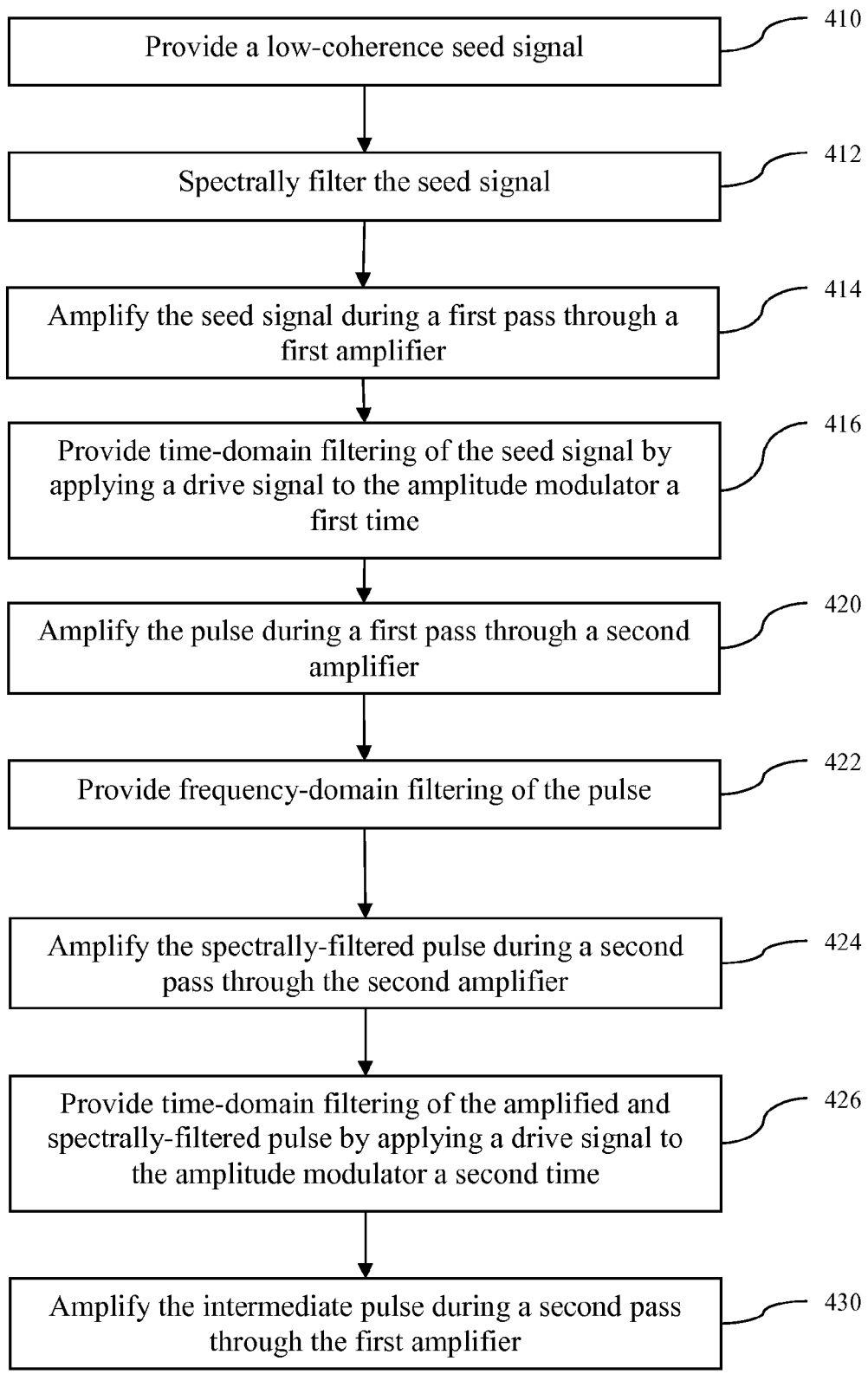
FIG. 4 is a simplified flowchart illustrating a method of providing a low-coherence high power pulsed optical emission according to an embodiment of the present invention.

FIG. 4 is a simplified flowchart illustrating a method 400 of providing a low-coherence high power pulsed optical emission according to an embodiment of the present invention. As illustrated in FIG. 4, the method includes providing a low-coherence seed source 410. The seed source may be a superfluorescent source of several nanometers of spectral bandwidth as discussed above. In some embodiments, the spectral bandwidth can reach 50 nm or 100 nm depending on the particular application.

The method also includes spectrally-filtering the seed signal 412. In some embodiments, the spectral filtering reduces the signal bandwidth in the range of 10 pm to 300 pm. The precise bandwidth reduction depends on the application at hand including the peak optical power provided by the application. The spectral bandwidth can be adjusted by choosing the proper filter bandwidth to limit Stimulated Brillouin Scattering (SBS) generation in the optical amplifiers. In some embodiments, the spectral filtering of the seed signal can be performed, as discussed above, using an optical circulator and a double-pass reflection of a reflecting structure like a Fiber Bragg Grating (FBG). In other embodiments, the spectral filtering can be performed using an optical notch filter. Notch filters can be procured, for example, from Semrock of Rochester, N.Y. Alternatively notch filters can be construed using a combination of optical long and short pass filters.

The method further includes transmitting the seed signal through a first optical amplifier to define a first pass through a first optical amplifier 414. During this transmission, the seed signal is amplified significantly. For example, the seed signal can be amplified by 10 dB to 20 dB. This first amplification permits the use of a low power and low-coherence seed signal. The method further provides for transmitting the seed signal through the amplitude modulator to define a first pass through the amplitude modulator and time-domain filtering of the seed signal to provide a pulse. The time-domain filtering process includes modulating a drive signal for the amplitude modulator a first time 416. The method additionally includes transmitting the pulse through a second optical amplifier to define a first pass through a second optical amplifier 420. During this transmission, the pulse is amplified significantly a second time. For example, the seed signal can be amplified by 10 dB to 20 dB. In some embodiments, the optical amplifiers are construed using rare-earth doped optical fibers. In other embodiments, the optical amplifiers are construed using rare-earth doped solid-state gain materials.

Moreover, the method includes frequency-domain filtering the amplified pulse to provide a spectrally filtered pulse 422. In some embodiments, the spectral filtering is achieved with Fiber Bragg Gratings. The method further includes transmitting and amplifying the spectrally-filtered pulse through the second amplifier to define a second pass 424. The amplified spectrally-filtered pulse is then transmitted through the amplitude modulator to define a second pass through the amplitude modulator and time-domain filtering of the amplified spectrally filtered pulse is performed to provide an intermediate pulse. The time-domain filtering includes modulating the drive signal for the amplitude modulator a second time 426. The method further includes transmitting the intermediate pulse through the first optical amplifier to define a second pass through the first optical amplifier 430.

It should be appreciated that the specific steps illustrated in FIG. 4 provide a particular method of providing a low-coherence high power pulsed optical emission according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

While the present invention has been described with respect to particular embodiments and specific examples thereof, it should be understood that other embodiments may fall within the spirit and scope of the invention. The scope of the invention should, therefore, be determined with reference to the appended claims along with their full scope of equivalents.

What is claimed is:

1. A high power pulsed optical source comprising:
a multi-port optical circulator;
a seed source coupled to a first port of the multi-port optical circulator, wherein the seed source is adapted to provide amplified spontaneous emission;
a first reflective device coupled to a second port of the multi-port optical circulator;
a first double-pass optical amplifier coupled at a first end to a third port of the multi-port optical circulator and coupled at a second end to an amplitude modulator;
a second reflective device coupled to the amplitude modulator; and
an output port coupled to a fourth port of the multi-port optical circulator.

2. The optical source of claim 1 further comprising a second double-pass optical amplifier coupled between the amplitude modulator and the second reflective device.

3. The optical source of claim 2 wherein the first double-pass optical amplifier comprises an optical fiber amplifier.

4. The optical source of claim 3 wherein the optical fiber amplifier comprises a rare-earth doped optical fiber.

5. The optical source of claim 4 wherein the rare-earth doped optical fiber comprises a mixture of one or more rare-earth elements.

6. The optical source of claim 5 wherein the one ore more rare-earth elements include at least one of Ytterbium, Erbium, Thulium, Holmium, Praseodymium, or Neodymium.

7. The optical source of claim 1 wherein the multi-port optical circulator comprises a plurality of three-port optical circulators.

8. The optical source of claim 1 wherein the seed source comprises a superfluorescent source.

9. The optical source of claim 8 wherein the superfluorescent source comprises a superfluorescent optical fiber source.

10. The optical source of claim 9 wherein the superfluorescent optical fiber source comprises:
a fiber loop;
an optical pump coupled to the fiber loop through a fiber coupler; and
a third reflective device coupled to a distal end of the fiber loop.

11. The optical source of claim 10 wherein the optical pump comprises a semiconductor laser.

12. The optical source of claim 1 wherein the seed source comprises an FBG-stabilized semiconductor laser.

13. The optical source of claim 1 wherein the amplitude modulator comprises a time-domain transmission filter.

14. The optical source of claim 13 wherein the time-domain transmission filter comprises a Mach-Zehnder interferometric amplitude modulator.

15. The optical source of claim 13 wherein the time-domain transmission filter is adapted to provide spectral-domain transmission filtering.

16. The optical source of claim 15 wherein the time-domain reflectance filter is substantially matched to an output spectrum of the seed source.

17. The optical source of claim 1 wherein the second reflective device comprises a spectral-domain reflectance filter.

18. The optical source of claim 17 wherein the spectral-domain reflectance filter comprises a Fiber Bragg Grating (FBG).

19. The optical source of claim 17 wherein the a reflectance spectrum of the spectral-domain reflectance filter is substantially matched to an output spectrum of the seed source.

20. The optical source of claim 1 wherein the second double-pass optical amplifier comprises an optical fiber amplifier.

* * * * *